United States Patent [19]

Fawley et al.

[11] Patent Number: 5,086,968

[45] Date of Patent: Feb. 11, 1992

[54] WELD REPAIRABLE COMBUSTOR

[75] Inventors: Robert W. Fawley; R. G. Keetley, both of San Diego; William D. Treece, LaMesa, all of Calif.

[73] Assignee: Sundstrand Corporation, Rockford, Ill.

[21] Appl. No.: 470,885

[22] Filed: Jan. 26, 1990

[51] Int. Cl.$^5$ .......................... B23K 1/19; B23K 31/02
[52] U.S. Cl. ..................................... 228/119; 228/231; 228/248; 228/263.13; 29/889.1
[58] Field of Search ............... 228/119, 193, 231, 248, 228/263.13; 148/11.5 N; 60/909, 722; 29/889.1, 402.16; 431/154

[56] References Cited

U.S. PATENT DOCUMENTS

| | | | |
|---|---|---|---|
| 3,632,319 | 1/1972 | Hoppin et al. | 228/263.13 |
| 3,678,570 | 7/1972 | Paulonis et al. | 228/263.13 |
| 4,442,968 | 4/1984 | McMurray et al. | 228/263.13 |
| 4,444,353 | 4/1984 | McMurray et al. | 228/263.13 |
| 4,478,638 | 10/1984 | Smith, Jr. et al. | 228/263.13 |
| 4,507,264 | 3/1985 | Stern | 228/263.13 |
| 4,508,257 | 4/1985 | Bose et al. | 228/263.13 |
| 4,614,296 | 9/1986 | Lesgourgues | 228/119 |

FOREIGN PATENT DOCUMENTS

| | | | |
|---|---|---|---|
| 2511908 | 3/1982 | France | 228/263.13 |
| 163091 | 12/1981 | Japan | 228/119 |

Primary Examiner—Samuel M. Heinrich
Attorney, Agent, or Firm—Wood, Phillips, Mason, Recktenwald & Van Santen

[57] ABSTRACT

Combustors of gas turbine engines in which components are brazed to the combustor are not easily repairable by conventional welding because the brazed joint includes a melting point depressant which may not only cause the joint to be brittle but also the melting point of the joint to be near or below the temperatures required for welding. These problems are solved by a relatively simple and inexpensive process for producing a weld repairable combustor which includes using a brazing powder mix comprising a metal powder compatible with the metals of the combustor and the article to be brazed to the combustor, and suitable melting point depressant in powder form, heating the brazing powder mix to a first temperature sufficient to cause the brazing powder mix to become molten, and finally heating the brazing powder mix at a second temperature for a sufficient time to cause the melting point depressant to substantially diffuse away from the brazed area. The resulting combustor formed by this process can be repaired by welding when cracks or other discontinuities requiring a weld repair are situated near or at the brazed joint, and this process avoids the expensive requirement of redesign of the combustor to a welded combustor configuration which would require major tooling, equipment and processing changes.

12 Claims, 1 Drawing Sheet

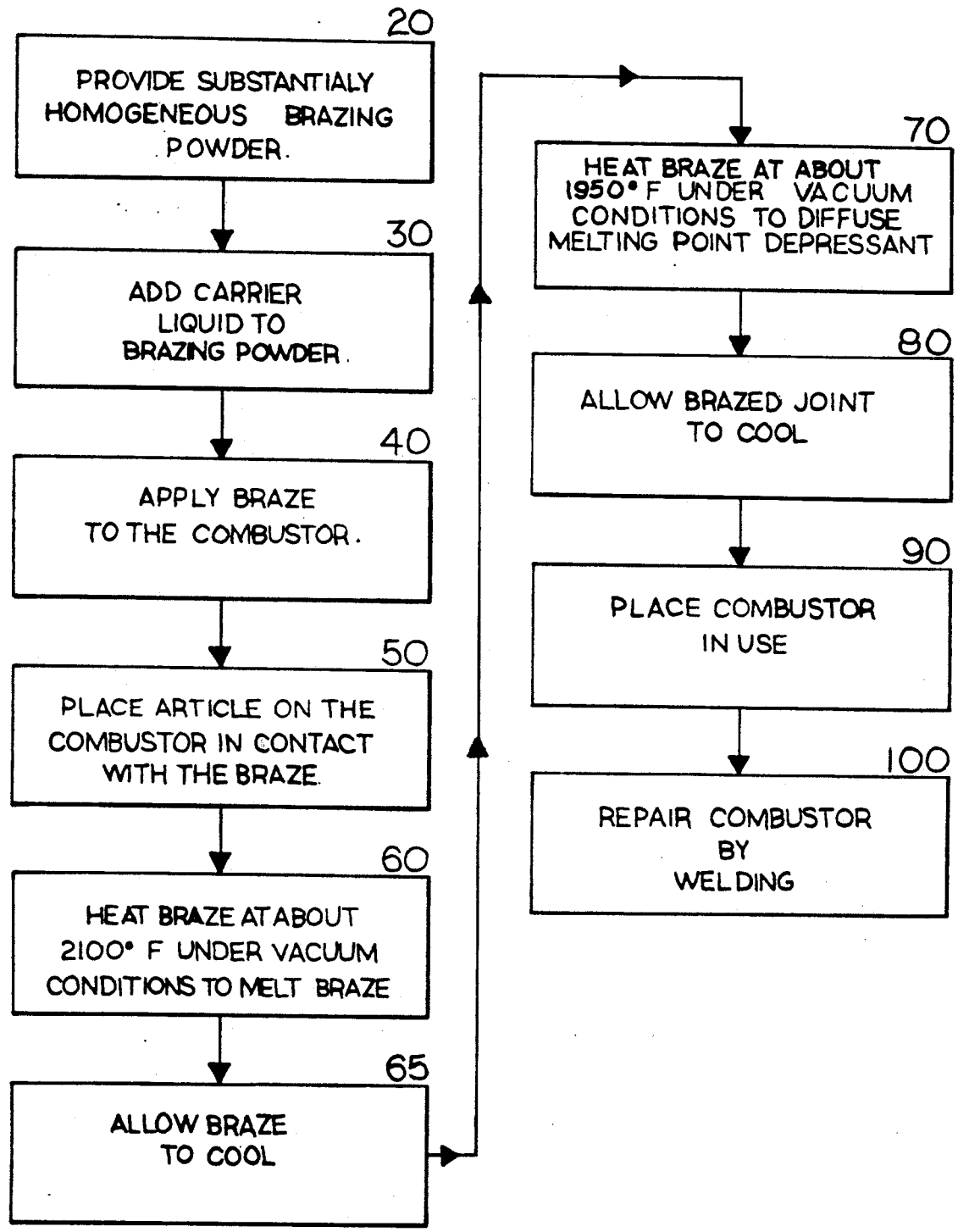

WELD REPAIRABLE COMBUSTOR

FIELD OF THE INVENTION

This invention relates to gas turbine engines and in particular to the combustors of the gas turbine engines which are weld repairable.

BACKGROUND OF THE INVENTION

Modern gas turbine engines which are used on aircraft are technically very complex machines. The high technology is especially apparent in the portions of the engine in which elevated temperatures are used. Not only are these components subjected to elevated temperatures, corrosion, and thermal fatigue, but they must be made as light as possible in design according to the dictates of their use in aircraft. Many of the components in modern gas turbine engines do have long lives; however, because of the hostile environment to which they are subjected, portions of a gas turbine engine have presented major maintenance problems. Since the components are rather costly because of the high technology used, repair or re-work of the engine is desirable over that of parts replacement.

One of the components which falls within the above context is the combustor of the engine. The combustor or burner is a portion of the engine where fuel is mixed with compressed air and combustion takes place. Increased performance levels of gas turbine engines can be obtained by increasing the operating temperatures thereof. In so doing the combustors of these gas turbine engines are exposed to extremely high temperatures and large variations in temperatures during engine operations.

As a result of the strenuous operating conditions, damage or deterioration in the form of cracks or other discontinuities including other openings can occur as from thermal cycling, impact from airborne foreign objects or their combinations. It has been observed that combustors can develop a number of small cracks while in or resulting from this strenuous service. Currently such cracks are repaired by welding. Sometimes repetitive repair welds are necessary in the same area because cracking also can occur during the repair operation.

Brazing is a common form of metal joining and consists of joining base metal surfaces by fusing a filler metal with a melting point depressant between the surfaces without appreciable fusion of the base metal surfaces themselves. The process is often an irreversible process with the filler metal or alloy forming an intermetallic solution with the metals being joined. Apart from compatibility with the base metal, filler metals are invariably selected for corrosion resistance in specific media and suitability for service at known operating temperatures.

Brazing is used to join sheet metal assemblies including combustor liners, combustor housings, air inlet ducts, cooling strips and others. A problem of damaging the brazed joints arises when welding near or on brazed areas of a combustor as the brazed area is relatively brittle. In fact, brazed components are currently considered to be nonrepairable by welding due to the embrittling effect of the braze materials on fusion welds. The reason for this embrittling effect is due to the use of melting point depressants which because of their nature cause the metal in which they are located to have a melting point less than that of the area to be welded such that during a repair operation when the temperature required for welding occur near or on the brazed areas, the brazed joints are more easily damaged.

As conventional repairs are carried out by welding, it would be advantageous to provide a combustor which can withstand weld repair. One alternative is to form the brazed connections by welding. However, this is not desirable as it would tend to increase manufacturing costs.

Accordingly what it needed is an improved method of forming brazed joints on combustors which overcomes the problems of the prior art. The present invention is directed to overcoming one or more of the above problems.

SUMMARY OF THE INVENTION

It is a principal object of the invention to provide an improved process for producing weld repairable combustors having at least one brazed joint thereon. The improved method comprises the following steps:

providing a substantially homogenous brazing powder, comprising a metal powder compatible with the parent metals of the combustor and the article to be brazed to the combustor, and a suitable melting point depressant in powder form, between the combustor and the article where the brazed joint is to be formed, heating the brazing powder to a first temperature sufficient to cause the brazing powder to become molten, and heating the brazing powder at a second temperature for a sufficient time to cause the melting point depressant to substantially diffuse away from the brazed area.

As a result, a high strength joint is provided and more importantly a weld repairable combustor is produced in a low cost, simple manner.

Another object of the invention is to avoid the costly alternatives to produce a weld repairable combustor; i.e. redesign to provide a welded combustor which would result in increased tooling, equipment and processing costs.

These and other objects and advantages of the invention will be more fully understood from the following description in drawing.

DESCRIPTION OF THE DRAWING

The FIGURE is a block diagram indicating the use of this process and forming a weld repairable combustor.

DESCRIPTION OF THE PREFERRED EMBODIMENT

Gas turbine combustors are currently made of a wide variety of materials including, but not limited to, 300 series stainless steels, nickel-based alloys such as Hastelloy X, and cobalt-based alloys such as L-605 and HS188. In turn, the articles which are brazed to the combustor are also formed from a wide variety of alloys, including those just listed.

The table indicates conventional alloys of which combustors are formed.

TABLE

| | Combustor Compositions (Wt %)* | | | |
|---|---|---|---|---|
| | Hastelloy X | L-605 | 300 Series Stainless Steels | Hs-188 |
| C | 0.05–0.15 | 0.15 (max) | 0.03–0.25 (max) | 0.05–0.15 |
| Cr | 20.5–23.0 | 14–21 | 16–26 | 20–24 |
| W | 0.2–1.0 | 14–16 | — | 13–16 |
| Ni | Bal. | 9–11 | 6–22 | 20–24 |
| Co | 0.5–2.5 | Bal. | — | Bal. |

TABLE-continued

| | Combustor Compositions (Wt %)* | | | |
|---|---|---|---|---|
| | Hastelloy X | L-605 | 300 Series Stainless Steels | Hs-188 |
| Mo | 8-10 | — | — | — |
| Fe | 17-20 | 3 (max) | Bal. | 3.5 (max) |
| Si | 1.0 (max) | 0.4 (max) | 1-3.0 (max) | 0.2-0.5 |
| B | 0.008 (max) | — | — | — |
| Mn | — | 1-2 | 2.0 (max) | — |
| La | — | — | — | 0.03-0.15 |

*(Approximate - May include trace amounts of other ingredients)

The melting point depressant used in this invention may be silicon, or phosphorus, and is preferably boron, while the metal powder of the brazing powder can be a variety of metal powders including the metals previously listed as those used for forming combustors.

As indicated by the FIGURE diagram, a substantially homogenous brazing powder mix is provided as shown by the block 20. The brazing powder includes a metal powder which should be compatible with and, most preferably, very similar in composition and capable of assuming a similar microstructure to the metals of the combustor and the article to be brazed to the combustor, and a melting point depressant in powder form.

Examples of brazing powders which may be used include DF915-BI and DF915-RB2, which are both nickel-based alloys including high chromium and boron content, manufactured by Alloy Metals, Inc. located in Troy, Mich. The brazing powder should be substantially homogenous so that the melting point depressant is present in substantially equal concentrations throughout the brazing powder. A sufficient carrier liquid is mixed with the powder to form a paste, block 30, so that application of the brazing powder can be more efficiently carried out.

The next step 40 contemplates applying the brazing powder mix or braze in the conventional manner to the combustor in the area in which the brazed joint will be formed.

The article to be brazed to the combustor is then situated on the combustor, typically with the aid of suitable fixtures, and with the brazing powder mix between the combustor and the article 50. There should be intimate contact between the article and the braze material to ensure good brazed joint formation.

The next step 60 constitutes heating the combustor and the article adjoining the braze powder mix, in a vacuum furnace to a first elevated temperature under vacuum conditions for a time sufficient to cause the braze material to become molten. The temperature at which heating should take place is about 2100° F., which is less than the melting point temperature of the metals used to form combustors and the articles brazed to the combustor. The melting point depressant in the braze material functions to lower the melting point. On average, the time that is required to cause the braze material to become molten is anywhere from 20 minutes to 45 minutes while, as known in the art, the vacuum should be about $10^{-4}$ torr.

Once the brazing powder is in a molten state the article is allowed to cool 65 so that the braze material solidifies and then the material is subjected to a second elevated temperature which is less than the first temperature and is about 1950° F., as shown at step 70. This heating also takes place in a vacuum furnace and is for a time sufficient to cause the melting point depressant to diffuse away from the brazed area or joint. The reason for doing this is to increase the melting point of the brazed joint to as near that of the parent metal of the combustor as possible.

The brazed joint, combustor, and article are allowed to cool, step 80, and thereafter the combustor is placed in use as indicated by a block 90. As previously discussed, combustors under working conditions normal to gas turbine engines are likely to develop sections which require repair such as cracks and quite often time these cracks appear near the particular brazed joint formed. When this occurs the combustor is then repaired by welding as shown by a block 100 which will provide no threat to the brazed joint as the melting point depressant has been substantially diffused from the joint and therefore the embrittling effect from the melting point depressant is avoided.

The article which is brazed to the combustor can include many components such as the liner, the housing, manifold, bracketing of various types and cooling strips. By providing a combustor according to this process, weld repairable joints and combustor components are provided in that the brazed joint can withstand the temperatures required in a weld repair. Further, because of the lack of embrittling effect present because of the diffusion of the melting point depressant, the joint strength is increased.

Other advantages of this invention include avoidance of expensive alternatives to this process. One such alternative is to redesign a combustor so that it is a substantially or completely welded combustor configuration. This would involve redesign of the existent product components and combustor, which in turn would increase the manufacturing cost and require major tooling, equipment and processing changes which would also incur further cost.

We claim:

1. A process for the formation of a weld repairable combustor having at least one brazed joint, comprising:
    providing a substantially homogenous brazing powder mix comprising a metal powder compatible with the metals of said combustor and an article to be brazed to said combustor, and a melting point depressant in powder form, between said combustor and said article where the brazed joint is to be formed;
    heating said brazing powder mix to a first temperature sufficient to cause said brazing powder mix to become molten;
    solidifying said molten brazing powder mix; then
    heating said brazing powder mix at a second temperature for a sufficient time to cause said melting point depressant to substantially diffuse away from said brazed area; and
    welding near or on said brazed area.

2. The process as recited in claim 1 wherein the melting point depressant is at least one selected from the group consisting of silicon, boron, and phosphorus.

3. The process as recited in claim 1 wherein the metal powder is formed of the parent metal of said combustor.

4. The process as recited in claim 1 wherein said first temperature is about 2100° F.

5. The process as recited in claim 1 wherein the second temperature is about 1950° F.

6. The process as recited in claim 1 wherein said article to be brazed to said combustor is a cooling strip.

7. The process as recited in claim 1 wherein said heating takes place is a vacuum furnace.

8. The process as recited in claim 1 further comprising, prior to the welding step, the steps of:
  allowing said brazed area to cool; and
  placing said combustor in use until a portion of the combustor near or on said brazed joint requires repair by welding.

9. The process as recited in claim 1 wherein the metal powder is a nickel-based alloy.

10. The process as recited in claim 1 wherein the second temperature is less than the first temperature.

11. A process for the formation of a combustor which will allow effective repair of a section of the combustor near a brazed joint by welding, comprising:
  providing a substantially homogenous brazing powder mix comprising a metal powder compatible with the metals of said combustor and an article to be braced to said combustor, and a melting point depressant in powder form selected from the group consisting of boron, silicon, and phosphorus, between and in abutment with said combustor and said article,
  subjecting said brazing powder to a first elevated temperature of about 2100° F. under vacuum conditions and for a sufficient time to cause said brazing powder to become molten, the first temperature being less than the melting point temperatures of said combustor and article;
  solidifying said molten brazing powder; then
  heating said brazing powder at a second temperature at about 1950° F. for a sufficient time to cause said melting point depressant to substantially diffuse away from said brazed joint area;
  allowing said brazed area to cool;
  placing said combustor in use until a portion of the combustor near said brazed joint requires repair; and
  repairing said combustor by welding.

12. A process for the formation of a weld repairable combustor having at least one brazed joint, comprising:
  providing a substantially homogenous brazing powder mix comprising a metal powder compatible with the metals of said combustor and an article to be brazed to said combustor, and a melting point depressant in powder form, between said combustor and said article where the brazed joint is to be formed;
  heating said brazing powder mix to a first temperature sufficient to cause said brazing powder mix to become molten;
  heating said brazing powder mix at a second temperature for a sufficient time to cause said melting point depressant to substantially diffuse away from said brazed area, the second temperature being less than the first temperature; and
  welding near or on said brazed area.

* * * * *